UNITED STATES PATENT OFFICE.

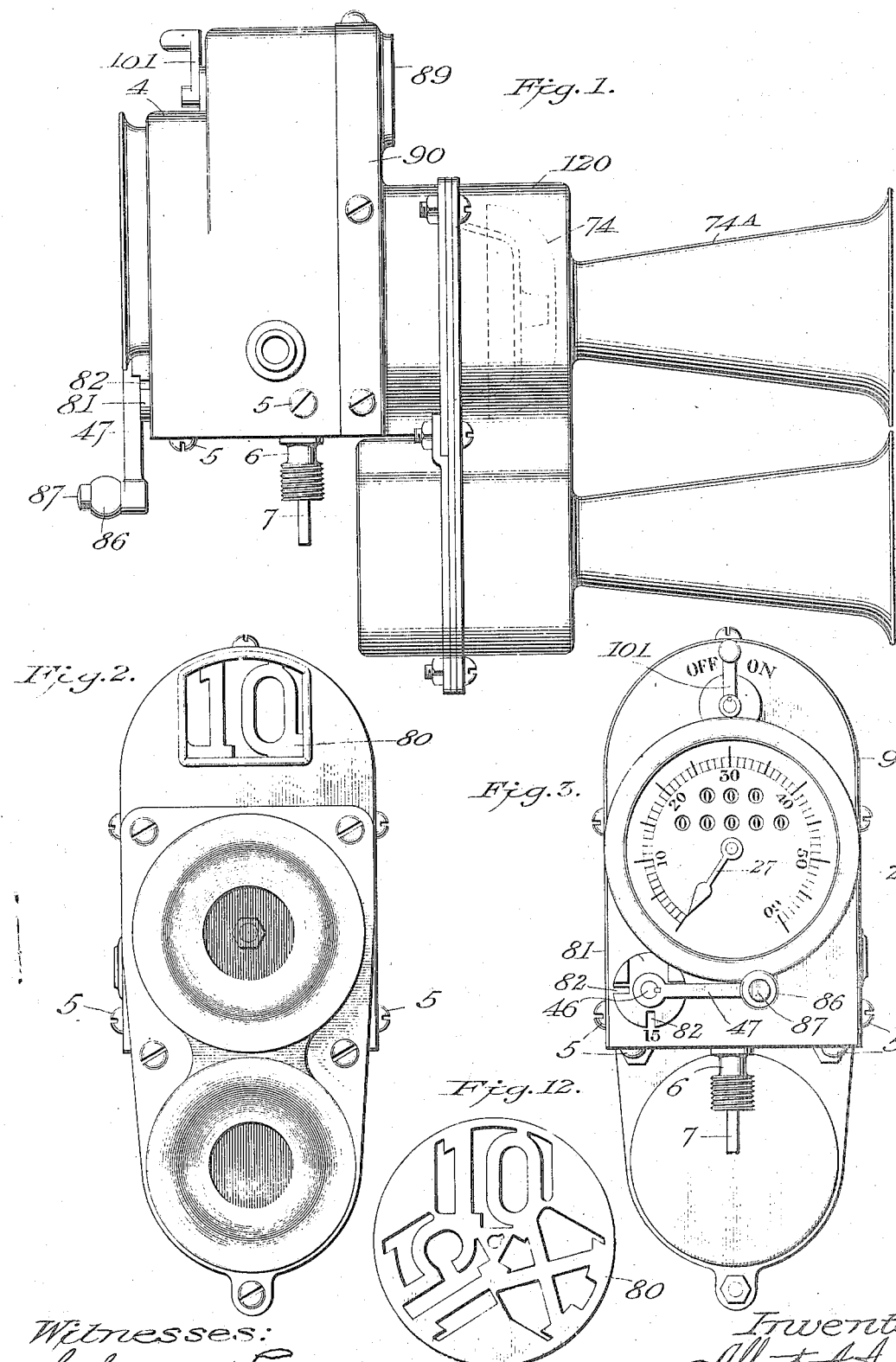

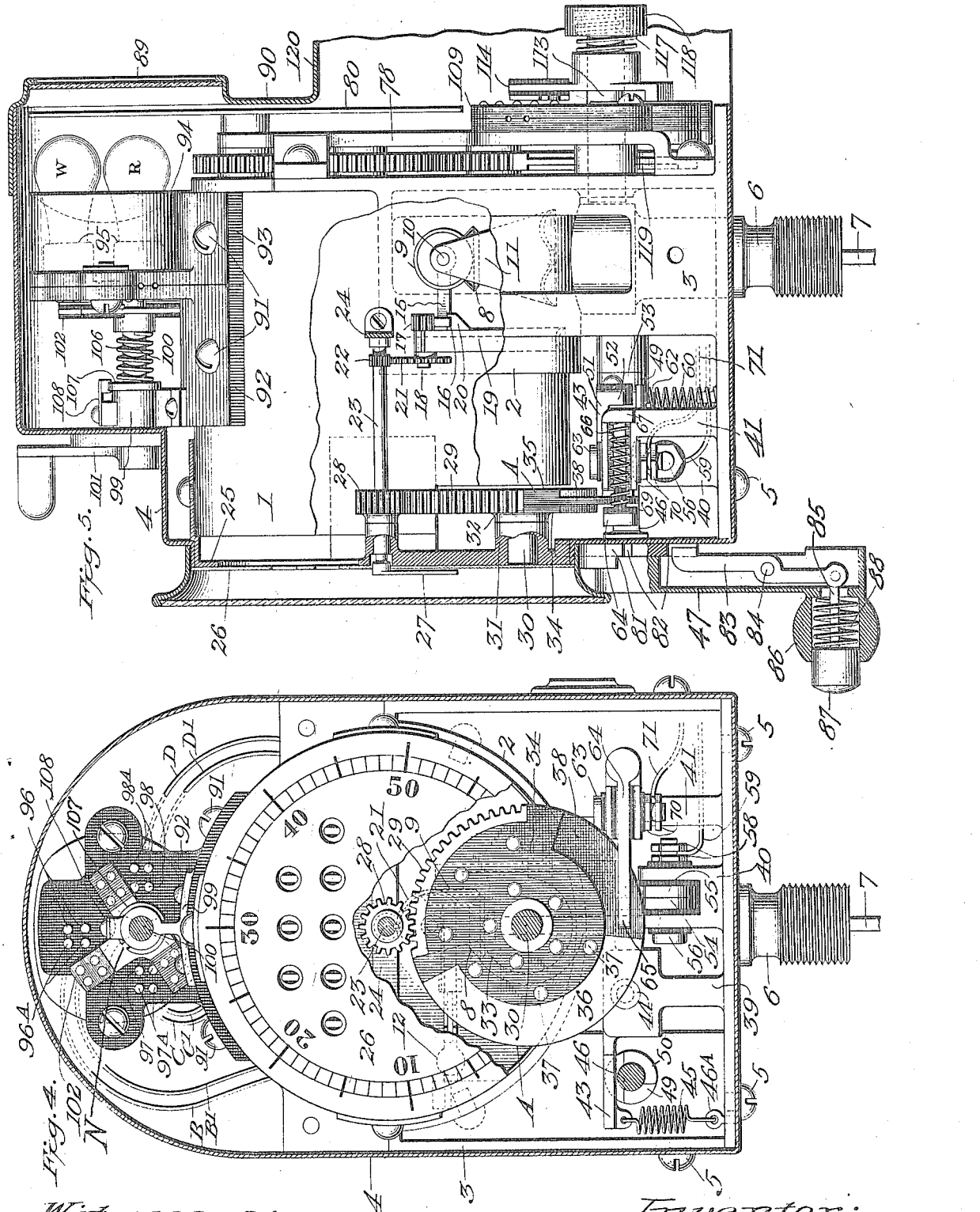

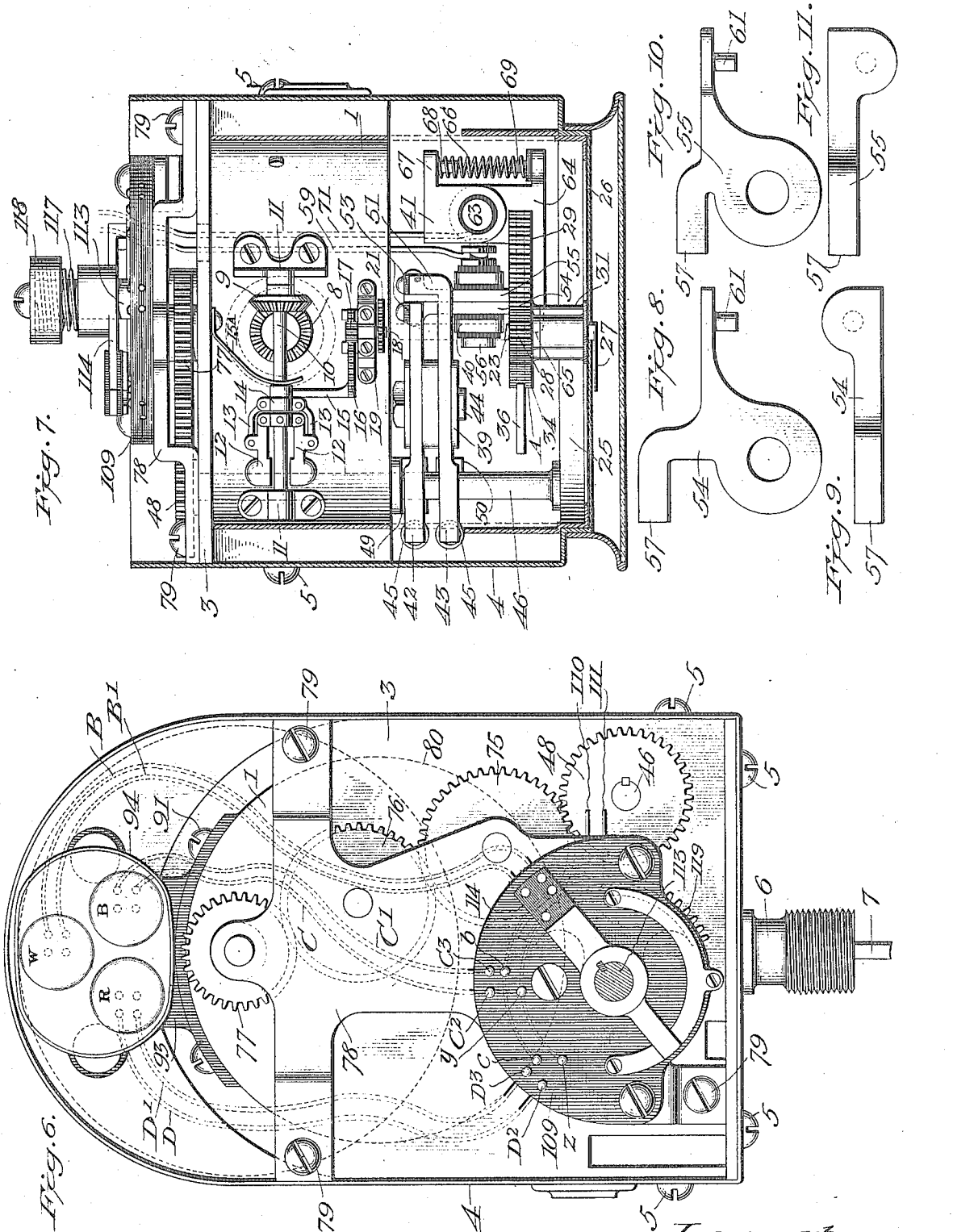

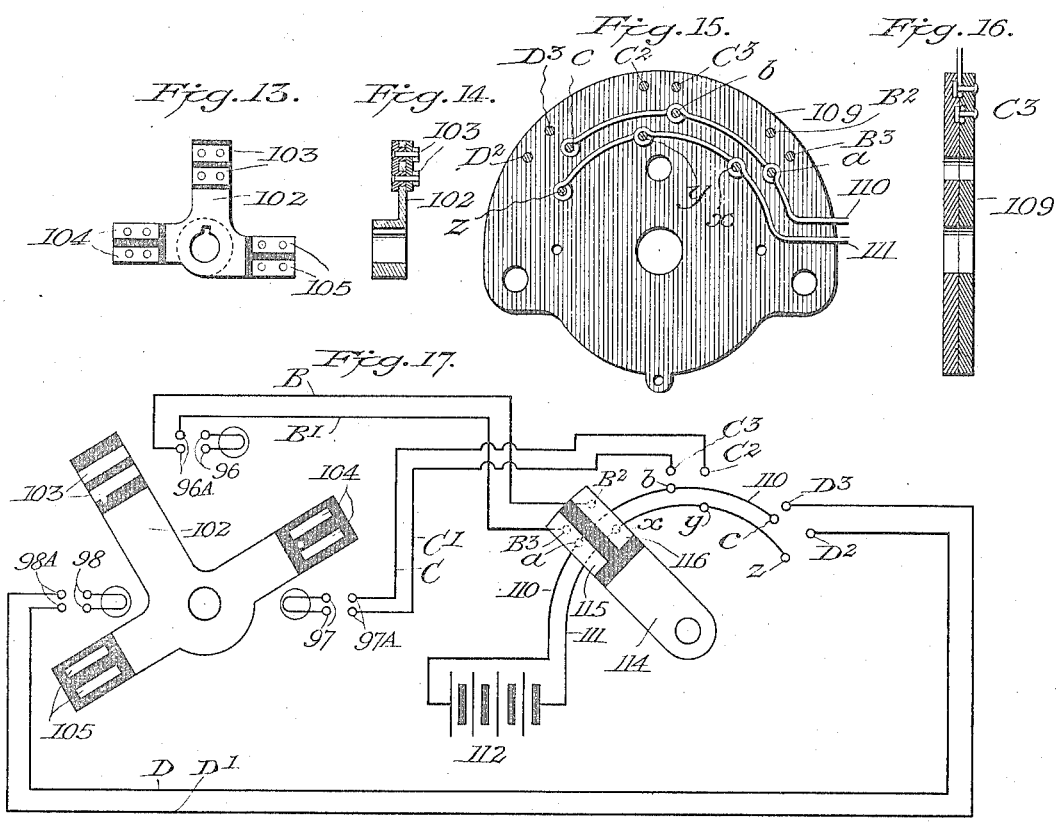

ALBERT A. AUSTIN, OF DENVER, COLORADO.

SPEED-LIMIT INDICATOR FOR AUTOMOBILES, MOTOR-CYCLES, AND OTHER VEHICLES.

1,180,278.  Specification of Letters Patent.  Patented Apr. 25, 1916.

Application filed November 5, 1914. Serial No. 870,441.

*To all whom it may concern:*

Be it known that I, ALBERT A. AUSTIN, a citizen of the United States of America, residing in the city and county of Denver and State of Colorado, have invented a new and useful Speed-Limit Indicator for Automobiles, Motor-Cycles, and other Vehicles, of which the following is a specification.

My invention relates to a new variable speed limit indicator for automobiles, motorcycles, and other vehicles, and the objects of my invention are: First. To provide a speed limit indicator that will automatically indicate by figures in a disk in daylight and by different colored lights showing through the disk at night, to drivers of other vehicles, pedestrians, traffic officers and policemen, under which one of the several different predetermined speeds for which the indicator can be set, the vehicle whereon the device is mounted, is running, and that will automatically indicate and warn the driver of the vehicle, the drivers of other vehicles, pedestrians, traffic officers and policemen, by the ringing of an alarm bell, when the vehicle is exceeding the speed at which the indicator is set. Second. To provide a speed limit indicator that can be easily adjusted to indicate several different predetermined speeds required by the ordinances of the different cities, counties and States, governing the maximum speeds at which vehicles are allowed to run. Third. To provide a speed limit indicator that will assist in causing the different cities, counties and States to pass uniform laws governing the maximum speeds at which vehicles are allowed to run. Fourth. To provide a speed limit indicator, the adoption of which by the different cities, counties and States, would stop the expense necessary in employing motorcycle policemen to trail vehicles to determine whether or not they are exceeding the maximum speed allowed by law. Fifth. To provide a simple, practical, variable, speed limit indicator made in a small compact form, that can be attached to the vehicle by a suitable bracket within sight of and within easy reach of the driver of the vehicle, and in a position where the indicator can be seen from in front of the vehicle and that can be actuated by and connected with one of the wheels of the vehicle by a suitable flexible shaft. I attain these objects by the mechanism illustrated in the accompanying drawings, in which;

Figure 1 is a side elevation of the improved speed limit indicator. Fig. 2 is a front elevation of the same. Fig. 3 is a rear elevation thereof. Fig. 4 is a rear elevation—full size—of the indicator, the casing being in section in order to give an unobstructed view of a portion of the mechanism thereof. Fig. 5 is a side elevation of the indicator mechanism, the casing and other parts being in section or broken away for clearer illustration. Fig. 6 is a front view of the indicator, the forward portion of the casing being removed. Fig. 7 is a plan view showing the complete mechanism comprising the indicator, with the exception of the lamps, the switch and the supporting standard therefor, which are omitted for clearer illustration, the casing being shown in section. Fig. 8 is a side view of the low speed contact terminal. Fig. 9 is a plan view thereof. Fig. 10 is a side view of the intermediate speed terminal contact. Fig. 11 is a plan view thereof. Fig. 12 is a front view of the speed limit indicating disk. Fig. 13 is a face view of the switch arm for breaking or for establishing a current between the lamps and the lamp circuit. Fig. 14 is a vertical sectional view thereof. Fig. 15 is a front view of one member of the light terminal support, showing the terminal wires thereon, connected to contact pins which are adapted to be engaged by a suitable switch arm, thereby to close a circuit through a battery and any one of the signal lamps employed. Fig. 16 is a vertical sectional view thereof. Fig. 17 is a diagrammatic view, illustrating the lamp circuit. Fig. 18 is a diagrammatic view illustrating the alarm bell circuit.

Referring to the accompanying drawings: The numeral 1 designates a hollow metal inner casing, which incloses and supports the governor mechanism which actuates the speed indicating hand, and also a rotatable circuit closer by which, in conjunction with suitable terminal contacts, a circuit is closed through a battery and an alarm bell, when the vehicle attains a speed in excess of a rate indicated by a suitable indicating device, whereby the ringing of the bell notifies the driver of the vehicle, pedestrians and traffic officers that he has exceeded the speed limit; all of which will hereinafter be fully set forth.

The casing 1 is supported in a semi-circular portion 2, of a standard or bracket 3, of any suitable character, which, with the governor casing, is inclosed within a casing 4, to which it is secured by screws 5. From the semi-circular portion of the bracket 3, depends a nipple 6, which extends out through the casing 4, the lower end of the nipple being externally threaded. To the threaded end of the nipple 6 is secured one end of the tubular casing of a flexible shaft—not shown—by means of which the rotative movement of the traction wheels of the vehicle upon which the indicator is placed, is communicated to an operating shaft 7 of the governor mechanism above mentioned, which may be of any suitable character, but which as illustrated, is arranged and constructed as follows: The shaft 7 extends down through the nipple and may be coupled to the flexible shaft in the usual manner, any illustration or description of this feature being deemed unnecessary, as it forms no part of my invention. The upper end of the shaft 7 carries a bevel gear 8, which meshes with a bevel gear 9, on a shaft 10, mounted in bearings 11, secured to the casing 1. Upon the shaft 10 are pivotally secured at their inner ends, a pair of centrifugally operating arms 12, the outer ends of which are weighted. These arms constitute a centrifugal governor, and between their extremities are pivotally secured the ends of arms 13, the free ends of which are pivotally connected to a slidable collar 14, also mounted on the shaft 10. This collar abuts against one end of an arm 15 slidably mounted on the shaft 10, and the free end of this arm carries a rack 16, at right angles to the said arm, and the rack teeth mesh with a pinion 17, on a shaft 18, mounted in a bearing on a standard 19, secured in the casing 1. The rack is supported in slideways 20, which maintain it in mesh with the pinion 17. On the opposite end of the shaft 18 is secured a segment gear 21, which meshes with a pinion 22, on a shaft 23, the inner end of which is mounted in a bearing on a transverse bracket 24, while its outer end is mounted in a bearing on the circular plate 25, upon which the speed indicating dial 26 is placed, as shown by Figs. 5 and 7, the outer extremity of the shaft 23 carrying the hand 27, which moves over the dial 26.

It will thus be seen by reference to Fig. 7, that rotation of the shaft 10, causes the arms 12, to swing out by centrifugal force by which the collar 14, through its connection with the arms 12, is pushed inward on the shaft 10, carrying with it the arm 15, having the rack 16, and the movement of the rack turns the pinion 17, and with it the shaft 18, and segment gear 21, which, through the pinion 22, turns the shaft 23, carrying the hand 27, which is thereby moved over the dial 26 to indicate the speed of the vehicle. A spring 15$^A$, which is secured to the standard 3, has a forked end which straddles the shaft 10, and normally bears against the end of the arm 15, and when the car slows down, this spring moves the arm 15 back and when the car stops the arm 15 is moved to initial position, together with all the parts actuated thereby. The shaft 23 also carries a gear wheel 28, which meshes with a segment gear 29, which forms part of a rotatable circuit closer A, which is mounted on a shaft 30. which is supported in a bearing 31, in the circular plate 25. The circuit closer A is circular in form and comprises the segment gear 29 above mentioned, which has a hub 32, from which projects a substantially semi-circular flange 33, and upon the side of the flange portion of the segment are secured plates 34 and 35, of suitable non-conducting material, having substantially semi-circular portions which are of slightly greater diameter than the flange of the segment. Between the parts of these plates 34 and 35, which extend beyond the flange of the segment, is secured a metal segmental conductor plate 36 by rivets 37, the non-conducting material extending between the inner edge of the plate 36 and the adjacent edge of the segment flange, so as to prevent the passage of current from the plate 36 to the segment gear 29. The segment plate 36 has the same radius as the toothed portion of the segment gear 29 and extends from near the uppermost portion of the segment gear around in an anti-clockwise direction for substantially a third of the circumference of the circuit closer A, and abuts against a curved extension 38 of the non-conducting plate 35, which extension 38 is of the same radius and same thickness as the segmental plate 36 so that the segment gear, the segmental plate 36, and the extension 38, together with portions of the non-conducting plate which extend a short distance beyond each end of the segment gear, form a complete circle, as will be understood by reference to Fig. 4.

The circuit closer A is turned in an anti-clockwise direction by the pinion 28, which is in mesh with the segment gear 29, for a purpose to be hereinafter fully explained.

The base plate of the standard 3 extends forward beneath the circuit closer A, and upon this extension are three vertical standards, 39, 40 and 41, which are preferably formed integral with the base. In the standard 39 are pivotally mounted levers 42 and 43, upon a common bolt 44. These levers are normally disposed on a horizontal plane, and the bolt 44 passes through them about centrally of their length. A downward pull is exerted upon the outer ends of these levers by contraction coil spring 45, the ends of which are connected to eyes formed on the under sides of their outer ends, and to screw eyes 46ᴬ, in the base plate of the standard 3. The forward portions of these levers normally rest upon a shaft 46, which is mounted in bearings in the standard 3. The rear end of this shaft extends through the adjacent face of the casing and is provided with a crank handle 47, which will be more fully described hereinafter, and the forward end thereof extends through the standard 3 and carries a gear wheel 48, the purpose of which will also appear later. The shaft 46 is provided with cams 49 and 50, the cam 49 being semi-circular, while the cam 50 is but a quarter circle. When the shaft 46 is turned by the crank handle 47, the cam 49 engages the lever 42 and rocks the same on its pivot bolt, whereby its outer end is raised and its inner end depressed. A further turning of the shaft 46 causes the cam 50 to engage the lever 43 and rock the same in like manner as the lever 42, the cam 49 holding the lever 42 in its rocked position after the lever 43 has been rocked.

The inner end of the lever 43 has a right-angled projection 51, which extends over flush with the inner end of the lever 42, and these inner ends of the levers have depending portions 52, to which are secured L-shaped pieces of suitable non-conducting or insulating material 53, as will be seen by reference to Figs. 5 and 7. The insulated ends of the levers 42 and 43 are adapted to bear upon the tails or pivotal contacts 54 and 55 respectively, which are mounted upon a common bolt 56, which extends through the side members of the standard 40, which is bifurcated as shown, for the purpose of supporting the contacts side by side, as will be seen by reference to Fig. 4. The contacts 54 and 55 are of the same general shape, comprising hub portions, through which the bolt 56 passes; tail portions, which are engaged by the inner ends of the levers 42 and 43, and contact members 57, which are adapted to contact with the non-conducting portion 38 of the circuit closer A, or with the conductor plate 36 of the said circuit closer, for a purpose to be presently shown. The member 57 of the contact 54 is preferably on a slightly higher plane than the corresponding member of the contact 55, in order that the contact 55 may be extended to lie beneath the contact 54, when the difference between low and intermediate speed is slight. These contacts 54 and 55 are insulated from the standard 40, and the bolt 46 is also insulated from the said standard, but the contacts are in electrical connection with the bolt 46. The threaded end of the bolt receives nuts 58, one of which serves to prevent displacement of the bolt, while the other acts in conjunction with the first nut to clamp the terminal end of a circuit wire 59, the purpose of which will appear later. When one or both of the levers 42 and 43 are rocked, the contacts 54 and 55 are also rocked on the bolt 56, and are thus moved out of engagement with the circuit closer A, and the contacts are again rocked to engage the circuit closer A, when released by the reverse movement of the levers 42 and 43, by expansion coil springs 60, which are interposed between their tails and the base plate of the standard 3, the tails being provided with depending teats 61, over which are placed non-conducting caps 62—see Fig. 5—which insulate the springs 60 from the tails of the contacts.

The standard 41 has a horizontal bifurcated portion at its upper end, through which passes a bolt 63, upon which is pivotally mounted a contact 64, in the form of an arm having a right-angled projection adjacent to its outer end through which the said bolt 63 passes, while its inner end has a slight lateral projection 65, which engages the opposite face of the circuit closer A from the contacts 54 and 55. The inner end of this contact is held in engagement with the circuit closer A by an expansion coil spring 66, which is interposed between its outer end and an extension 67 on the upper end of the standard 41, a teat 68 being formed on the extension to hold the spring in place at that end, while a non-conducting teat or projection 69 is secured upon the outer end of said contact to insulate it from the spring 66. The threaded end of the bolt 63 receives nuts 70, one of which holds the bolt in place, while the other acts in conjunction with the first nut to clamp the terminal end of a circuit wire 71. This wire 71 leads to one pole of a battery 72—see diagram, Fig. 18—which is located at any convenient point in the car or vehicle to which the indicator is attached, and from the other pole of the battery a wire 73 extends to one terminal of an electric alarm bell 74, which, for convenience, is located in an extension of the indicator casing, to be presently described, and to the other bell terminal is attached one end of the wire 59, which is electrically connected with the bolt 56, upon which the contacts 54 and 55 are mounted. Thus when the contacts 54, 55 and 64 engage the non-conducting portion 38 of the circuit closer A, the circuit through the battery 72 and bell 74 is broken, but when the vehicle exceeds the speed limit the circuit closer A is turned by the pinion 28 meshing with the segment gear 29, and the conductor plate 36 passes between the contact 64, and one or both contacts 54 and 55, thereby closing a circuit through the battery and bell, by which the bell is caused to ring and thus notify the driver of the vehicle that he is exceeding the speed limit; the hand 27 also indicating the speed attained. The bell continues to ring until the vehicle is slowed down to or below the required limit, when the circuit through the bell is broken, as before described, and the bell ceases ringing. The bell will also give notice to a traffic officer or other officer having authority in such matters, that the vehicle is exceeding the speed limit determined upon by the city or county ordinances; but in addition to the bell I provide means by which a predetermined speed may be indicated both by day and night, so that an officer may ascertain at a glance whether or not the speed at which the vehicle is running is in excess of that prescribed by law. This feature of my indicator is as follows: The gear wheel 48 on the end of the shaft 46 meshes with a gear wheel 75, which meshes with a gear wheel 76, which meshes with a gear wheel 77, the wheels 75, 76 and 77 being mounted on short shafts which are journaled in the back plate of the standard 3, and in a bracket 78, which is secured to the said standard by screws 79, the gears lying between the said bracket and back plate. The gears 75 and 76 are of the same diameter, but the gear 77 is of smaller diameter, its diameter being such, relatively to the diameter of the gear 48, that a quarter rotation of the gear 48 effects a third of a complete rotation of the gear 77. The forward end of the shaft of the gear 77 carries a disk 80, through which are cut figures indicating low speed, intermediate speed and unlimited speed, the numbers for low and intermediate speed being in accordance with local ordinances, while the letter X indicates unlimited speed. The disk is so cut as to leave the body of the numbers solid, while the space between them and on their sides is open so as to permit an electric light back of the disk to shine through the openings, and thus outline the number. By reference to Fig. 12, which is a front view of the disk 80, it will be seen that 10 indicates low speed, 15 high speed and X unlimited speed.

In Fig. 3 the crank handle 47, by which the shaft 46 carrying the gear wheel 48 is turned, is in the position it occupies when the figure 10 is visible on the disk 80; in Figs. 1 and 5, the crank handle is in the position it occupies when the number 15 is visible, and another quarter turn to the left, from the latter position, brings the letter X into view.

In order to lock the crank handle in any one of these positions I secure a disk 81 to the rear face of the casing through which disk the end of the shaft 46 passes. This disk is provided at three points with notches 82, the space between the notches equaling one quarter of the circumference of the disk 81. The crank handle 47 is hollow and open on its rear side, and in this handle is a latch 83, which is pivotally mounted about midway of its length on a pin 84, which extends through the sides of the handle. The inner end of the latch is adapted to enter any one of the notches 82, in the disk 81 and thus lock the crank handle in a given position. The outer end of the latch is pivotally connected to the end of a rod 85, which extends through the knob 86 of the crank handle and receives a push button 87, which is slidably mounted in an aperture in the knob, an expansion spring 88 being interposed between the inner end of the push button and an abutment at the opposite end of the knob, which serves to hold the latch in engagement with a notch 82. To disconnect the latch it is only necessary to press upon the push button, whereby the latch is rocked and its locking end is moved out of the notch and the handle is then free to be turned, and when the next notch is reached the latch is thrown into engagement with the same by means of its spring 88. It will thus be seen that by turning the crank handle 47, the disk 80, through the medium of the gears 48, 75, 76 and 77, is turned to bring the required number thereon uppermost or in position to be seen through a window 89 in a cap 90, which closes the front of the indicating casing. The number on the disk indicating the speed limit can be readily ascertained by daylight, but in order that the same may be seen by night, I mount behind the disk 80, three incandescent lamps, one of which is designed to shed a white light and designates low speed. The next lamp in order sheds a blue light and indicates intermediate speed, and the remaining lamp sheds a red light and indicates unlimited speed. These lamps are designated respectively by the letters W, B and R. The manner of connecting these lamps in circuit with a battery and of closing a circuit between the required lamp and the battery is as follows: Upon the top of the casing 1 is secured by screws 91, a two-part, non-conducting switch board or standard, comprising matching and similarly shaped members 92 and 93, which are placed one against the other, as shown in Fig. 5. A reflector casing 94 is secured to the part 93 and lamp sockets 95 are also secured to the part 93 within the reflector casing. The lamp terminals are arranged to engage suitable contacts which extend through both members of the standard and project slightly beyond the face of the member 92, these contacts being numbered 96, 97 and 98, respectively; the numeral 96 designating the white light terminals; the numeral 97 designating the blue light terminals, and the numeral 98 designating the red light terminals.

Adjoining each pair of lamp terminal contacts, but insulated from them, are contacts 96$^A$, 97$^A$ and 98$^A$, which also extend through and beyond the face of the member 92 of the standard. A bearing 99 is secured upon the outer end of the base portion of the member 92 and a shaft 100 is mounted in this bearing and preferably extends through the member 92, the opposite end of the shaft being provided with a crank handle 101. Upon this shaft is mounted a switch 102, which may be feather-keyed or otherwise secured to the shaft so as to turn therewith, but slide slightly thereon. The switch 102 comprises three arms, upon each of which are secured pairs of conducting strips 103, 104 and 105, which, when the switch is on, are adapted to contact with the lamp terminal contacts. and the contacts 96$^A$, 97$^A$ and 98$^A$, the conductors 103 engaging the contacts 96 and 96$^A$, the conductors 104 engaging the contacts 97 and 97$^A$, and the conductors 105 engaging the contacts 98 and 98$^A$, the conductor strips being insulated from the switch. The switch 102 is held in resilient engagement with the contacts by means of a coil spring 106, which is interposed between a hub on the switch and an integral collar 107 on the shaft, and a spring dog 108 is secured to the bearing 99 and engages notches N in the collar 107 to hold the switch either on or off the contacts, as will be seen by reference to Figs. 4 and 5.

Wires B and B$^1$, C and C$^1$, and D and D$^1$ extend from the contacts 96$^A$, 97$^A$ and 98$^A$ to contacts B$^2$ and B$^3$, C$^2$ and C$^3$, and D$^2$ and D$^3$ respectively, secured in and projecting from a two-part non-conducting switchboard 109, which is screwed to the bracket 78. Between the two members of the switchboard 109 are secured the terminal ends of circuit wires 110 and 111, which connect with the poles of a battery 112, which is placed in any convenient part of the vehicle using the indicator. The wire 110 is electrically connected to suitable contacts $a$, $b$ and $c$, which are secured in and project beyond the face of the switch board, and the wire 111 is electrically connected to suitable contacts $x$, $y$, and $z$, also projecting beyond the face of the switchboard. A shaft 113 is mounted in the standard 3 and in the bracket 78, and extends through the switchboard 109, and has mounted on its outer portion a switch arm 114, which is feather keyed to said shaft, the upper end of which is provided with a pair of conductor strips 115 and 116, the strip 115 being adapted to cover the contacts $a$, $b$ and $c$, and any one of the contacts B$^3$, C$^3$, and D$^3$, as the arm is swung over the board; and the strip 116 being adapted to cover the contacts $x$, $y$, and $z$, and the contacts B$^2$, C$^2$ and D$^2$, as will be understood by reference to the diagram Fig. 17.

The tail end of the switch 114 slides upon a semicircular metal strip which is secured to the switch board 109, and the arm is held in resilient engagement with the switchboard by a coil spring 117, which surrounds the shaft 113 and is interposed between a hub on the switch arm and a cap 118, which is screwed upon the extremity of the shaft 113, the conductors 115 and 116 being insulated from the switch arm.

Upon the shaft 113 between the standard 3 and the bracket 78 is rigidly mounted a segment gear 119, which meshes with the gear wheel 75. When the white light denoting low speed is desired, the switch arm 114 and segment gear 119 are in the position shown in Fig. 6. When the disk 80 is turned to indicate intermediate speed, the gear wheel 75 turns the segment gear 119, and the switch 114 is turned to a vertical position or so as to close a circuit through the blue light lamp, and when this disk 80 is turned to indicate unlimited speed the gear 75 turns the switch 114 to close a circuit through the red light lamp.

To the cap 90, which closes the front of the indicator casing, is secured a housing 120, in the upper part of which the bell 74 is located, a horn 74$^A$ being secured to the said housing in line with the said bell and in the lower part thereof the mechanism for operating an electric horn is placed, which is secured to the front of the said housing, as shown by Fig. 1, but all description of the electric horn and operating mechanism therefor is omitted, as they form no part of the present invention.

In operation, assuming that it is desired to run the vehicle employing the improved indicator, on low speed, then both of the contact arms 54 and 55 are in engagement with the non-conducting element 38 of the circuit closer A; but if it is desired to run the car or vehicle on intermediate speed, the shaft 46 is partially rotated by means of the crank handle 47, and the lever 42 is rocked by the cam 49 on said shaft, thereby tilting the contact 54 in the manner before described, leaving the contact 55 in engagement with the member 38 of the circuit closer A. If, however, it is desired to run the car on unlimited speed, the shaft 46 is still further turned and the cam 50 on said shaft rocks the lever 43, and the contact 55 is swung out of engagement with the circuit closer A, thus preventing the closing of a circuit through the alarm bell, which, in consequence, will not ring, no matter what speed may be attained by the car. In running on either low or intermediate speed, however, when the speed exceeds the limit indicated on the disk 80, the circuit closer is turned in the manner previously described, and the conductor plate 36 thereon passes between the contact 64 and the contacts 54 and 55 if on low speed; and 64 and 55 if on intermediate speed; and immediately a circuit is closed through the battery 12 and 13 bell 74 through the medium of the wires 59, 71 and 73, the wire 59 connecting the contacts 54 and 55 with one of the bell terminals, the wire 71 connecting the contact 64 with one pole of the battery 72, and the wire 73 connecting the other pole of the battery with the remaining bell terminal. The switch 102 is turned to the position shown in Fig. 4 during the day, so as to cut out the lamps from the light circuit, but at night the said switch is turned to connect all of the lamps with the light circuit, but the circuit is only closed through the lamp indicating the speed limit beyond which the car is not supposed to run, the switch 114 being in position to close a circuit through this lamp only, and the battery 112. Assuming then, that the switch 102 is on, or turned to connect the lamps with the light circuit, and that the disk 80 indicates a speed limit of ten miles per hour, the switch arm 114 will stand in the position shown in Fig. 6, and its conductor plate 115 will cover the contact a, connected with wire 110 of the battery circuit and the contacts B³ in the lamp circuit, while the conductor 116 covers the contact x connected with the wire 111 of the battery circuit and the contact B² of the lamp circuit, whereby a circuit is closed through the contacts B² and wire B, and through a conductor on the switch 102, to the contacts 96^A and 96, and through the lamp and other contacts 96^A and 96, and switch conductor, the wire B¹, contacts B³ and a, and wire 110 to battery 112, thence through wire 111 and contacts x and B², thus completing the circuit.

The circuits through the blue light lamp and through the red light lamp are closed in like manner, as described in connection with the white light lamp, by the movement of the switch 114 when the shaft 46 is operated to turn the disk 80 to indicate the required speed.

Having described my invention, what I claim as new and desire to secure by Letters Patent, is:

1. In a speed limit alarm and indicator for vehicles, the combination with a rotatable member having a non-conducting element and an adjoining conducting element, of adjoining contacts in normal engagement with one side of the said non-conducting element, a contact in engagement with the other side thereof, levers for moving one or both of said adjoining contacts out of engagement with the rotatable member, means for operating said levers, a speed limit indicating disk, and means operated by the said lever operating means, whereby the said disk is turned a predetermined distance, and means operated by the vehicle traction wheels for turning said rotatable member when the vehicle exceeds a predetermined speed.

2. In a speed limit alarm and indicator for vehicles, the combination with a rotatable member having a non-conducting element, and a conducting element adjoining said non-conducting element, of a pair of pivotally mounted contacts in normal engagement with one side of said non-conducting element, a single contact in normal engagement with the other side thereof, centrally pivoted levers engaging each one of the pair of contacts, a shaft, and cams thereon, one of which rocks one of the said levers when the shaft is partially rotated, and the other of which rocks the other lever when the shaft is further rotated, whereby one or both of said contacts may be moved out of engagement with the rotatable member, a gear wheel on the end of said shaft, a speed limit indicating disk, and gearing connecting the same and the said gear wheel on the end of the shaft, whereby the said disk is partially rotated simultaneously with the rocking of each lever and the consequent disengagement of the contact operated by it, with the rotatable member, and means operated by the vehicle traction wheels for turning said rotatable member when the vehicle exceeds a predetermined speed.

3. In a speed limit alarm and indicator for vehicles, the combination with a circular rotatable member, comprising a segment gear, a non-conducting member and an adjoining conducting member, of a shaft, a pinion on said shaft in mesh with said segment gear, a centrifugal governor, means operated by the traction wheels of the vehicle for actuating said governor, and means operated by the governor for partially rotating said pinion, a pair of contacts in normal engagement with one side of said non-conducting member, the one next the conducting member determining low speed and the other determining intermediate speed, a contact in normal engagement with the opposite side of said non-conducting member, levers for moving one or both of said first mentioned contacts out of engagement with the non-conducting member, a cam shaft for operating said levers independently, a speed limit indicating disk, gearing connecting said disk and said cam shaft, whereby the disk is given a partial rotation simultaneously with the partial rotation of the cam shaft to expose a numeral corresponding to the speed defined by the contact in engagement with the rotatable member, said conductor being moved between said contacts, when the vehicle exceeds a predetermined speed.

4. In a speed-limit alarm and indicator for vehicles, the combination with a circular rotatable member comprising a segment gear, a non-conducting member and a conducting member adjoining the non-conducting member, of a support, a bolt extending through said support, a pair of contacts pivotally mounted on the bolt, and springs for normally holding said contacts in engagement with one side of said rotatable member, levers for independently moving said contacts out of engagement with the rotatable members, a cam shaft for actuating said levers in an inoperative position, a spring actuated contact in normal engagement with the opposite side of the rotatable member, a speed-indicating dial, a shaft, a hand on said shaft adapted to pass over said dial, a pinion on said shaft in mesh with said segment gear, and means operated by the traction wheels of the vehicle for turning said shaft, a speed-limit indicating disk, means connecting the said disk with the cam shaft for turning said disk, said conductor being moved between said contacts when the vehicle exceeds a predetermined speed.

5. In a speed-limit alarm and indicator for vehicles, the combination with a movable conductor having a non-conducting portion, a contact in normal engagement with one side of said non-conducting portion, a pair of contacts in normal engagement with the opposite side thereof, of levers for moving said pair of contacts out of engagement with the said non-conducting portion, a cam shaft for operating said levers independently, a crank handle on said cam shaft, a fixed notched disk surrounding said shaft adjoining the crank handle, and a spring controlled latch in said handle for engaging said disk, and means operated by the traction wheels of the vehicle for moving said conductor between said contacts when the speed of the vehicle exceeds a predetermined limit.

6. In a speed limit alarm and indicator for vehicles, a casing, a speed indicating dial thereon, a shaft mounted in the casing, a hand on the shaft adapted to travel over said dial, means operable by the movement of the vehicle for turning said shaft, a gear wheel on the shaft, a rotatable member having teeth in mesh with said gear wheel, and provided with adjoining conducting and non-conducting elements, a contact in normal engagement with one side of the non-conducting element, a pair of adjoining movable contacts in normal engagement with the other side thereof, said contacts defining low and intermediate speeds respectively, a speed limit indicating disk in said casing visible through a window therein, means for turning said speed limit indicating disk to expose a character denoting a speed limit, and means operated by the disk-turning means for moving the contact defining low speed out of engagement with the non-conducting element when the disk turning means is but partially rotated, and the contact defining intermediate speed, when the said disk turning means is further rotated, said conductor being moved between the contacts to close a circuit when the vehicle exceeds a predetermined speed, and means for moving the conductor out of engagement with the contacts when the speed of the vehicle decreases to or below that indicated by the said disk.

In testimony whereof I affix my signature in presence of two witnesses.

ALBERT A. AUSTIN.

Witnesses:
G. SARGENT ELLIOTT,
ADELLA M. FOWLE.